(12) United States Patent
Degeratu et al.

(10) Patent No.: US 8,060,451 B2
(45) Date of Patent: Nov. 15, 2011

(54) SYSTEM AND METHOD FOR FACILITATING SKILL GAP ANALYSIS AND REMEDIATION BASED ON TAG ANALYTICS

(75) Inventors: Melania Degeratu, South Plainfield, NJ (US); Neal M. Keller, Pleasantville, NY (US); Michael Sava, Peekskill, NY (US); Wlodek W. Zadrozny, Tarrytown, NY (US); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 11/764,024

(22) Filed: Jun. 15, 2007

(65) Prior Publication Data
US 2008/0313000 A1 Dec. 18, 2008

(51) Int. Cl.
*G06Q 99/00* (2006.01)
(52) U.S. Cl. ...................................................... 705/319
(58) Field of Classification Search .................. None
See application file for complete search history.

(56) References Cited

U.S. PATENT DOCUMENTS

| | | | | |
|---|---|---|---|---|
| 5,329,596 | A * | 7/1994 | Sakou et al. | 382/226 |
| 6,539,375 | B2 * | 3/2003 | Kawasaki | 707/5 |
| 7,401,087 | B2 * | 7/2008 | Copperman et al. | 707/101 |
| 7,467,079 | B2 * | 12/2008 | Morimoto et al. | 704/9 |
| 7,536,637 | B1 * | 5/2009 | Nauerz et al. | 715/230 |
| 2002/0035573 | A1 * | 3/2002 | Black et al. | 707/104.1 |
| 2003/0177027 | A1 * | 9/2003 | DiMarco | 705/1 |
| 2004/0133546 | A1 * | 7/2004 | Oni | 707/1 |
| 2005/0240608 | A1 * | 10/2005 | Jones et al. | 707/101 |
| 2006/0031087 | A1 * | 2/2006 | Fox et al. | 705/1 |
| 2006/0155558 | A1 * | 7/2006 | Corpening | 705/1 |
| 2007/0198506 | A1 * | 8/2007 | Attaran Rezaei et al. | 707/5 |
| 2007/0250496 | A1 * | 10/2007 | Halliday et al. | 707/5 |
| 2007/0271270 | A1 * | 11/2007 | Dubinko et al. | 707/7 |
| 2008/0059478 | A1 * | 3/2008 | Craine | 707/10 |
| 2008/0294624 | A1 * | 11/2008 | Kanigsberg et al. | 707/5 |
| 2008/0306918 | A1 * | 12/2008 | Mons et al. | 707/3 |

OTHER PUBLICATIONS

Indexing by Latent Semantic Analysis, Journal of American Society for Infomraiotn Science, 41(6) 1990; Deerwester et al.*
An automatic method for constructing domain specific ontology resources; Proc of the Language of Resources and Evaluation Conference; Lisbon Portugal 2004.*
It's Who you Know; IBM Think Research, Jul. 2005, Ehrlich etal.*

* cited by examiner

*Primary Examiner* — Traci Casler
(74) *Attorney, Agent, or Firm* — Scully, Scott, Murphy & Presser, P.C.; Daniel P. Morris, Esq.

(57) ABSTRACT

This invention includes a workforce management system having a system bus, at least one database in communication with the system bus that includes data representative of workforce employees, and social networking data associated with the employees. A matching functional unit includes a text mining function for mining contextual information from the at least one database to generate context labels for an employee, a clustering function for generating concept labels for an employee, and a matching function that sorts and matches employees by the labels in accordance with a matching criteria. A user interface provides user input to the support operation of the workforce management system.

19 Claims, 5 Drawing Sheets

SYSTEM AND METHOD FOR FACILITATING SKILL GAP ANALYSIS AND REMEDIATION BASED ON TAG ANALYTICS

BACKGROUND OF THE INVENTION

The present invention relates to the field of human-resources management. More specifically, the invention relates a system and method for managing human resources with matching and mentoring services that operate on tag analytics, and implement skill gap analysis and remediation of the human resources based on the tag analytics.

Research in workforce management, or more broadly, human resources management, and learning focuses on creating innovative learning technologies to enhance worker performance, student performance, or more broadly, the performance of a member of an organized group of human resources. Such learning technologies represent and validate member (e.g., employee) skills, for example, for the purpose of facilitating matching people to opportunities, and supply chain modeling to optimize human resource planning and management.

Human resources management and learning may be described broadly to include at least the following: 1) hiring and firing; 2) salary and benefits administration; 3) creating innovative learning technologies to enhance student performance and increase learning through personalization and contextualization; 4) representing and validating employees' skills; 5) facilitating reskilling and matching people to available opportunities within an organization or workforce; and 6) applying supply chain modeling and mathematical algorithms to optimize human resource planning and management.

Several previously disclosed techniques in human resources management have addressed various aspects of employee skill identification, rating and ranking for purposes of improving performance via mentoring, classroom and self study and for optimizing matching of employees with new project requirements. For example, published US Patent Application No. 20060256953A1 to Pulaski, et al. ("the '953 application"), filed May 12, 2005, and incorporated by reference herein, discloses a method and system for improving workforce performance in a contact center. The '953 application describes technology for monitoring, in real time, the performance of call center agents to determine if their actions warrant timely performance support. The '953 application teaches the use of rules as the basis for the analysis of agent actions and also identify top performers so their best practices can be learned by underperformers.

Published US Patent Application No. 20050222899A1, to Varadarajan, et al. ("the '899 application"), filed Mar. 31, 2004, and incorporated by reference herein, discloses a system and method for skill management of knowledge workers in a Software Industry. The system and method track the initial skills of a member when joining an enterprise and track changes in skill sets as a result of additional training and project assignments. The skill assessment, updating and matching subsystems as taught by the '899 application rely on a common dictionary of software development processes known to practitioners in the software industry.

Published US Patent Application No. 20030182178A1, to D'Elena et al. ("the '178 application"), filed Mar. 21, 2002, and incorporated by reference herein, discloses a system and method for skill proficiencies acquisitions to identify skill gaps based on a comparison of an employee's skill profile and a job role skill profile and recommend various skill acquisition options suitable for an employee's work routine and learning style. Published US Patent Application No. 20020198765A1, to Magrino et al. ("the '765 application"), filed Mar. 20, 2002, and incorporated by reference herein, discloses a human capital management performance capability matching system and methods to rank the skill sets of members of a workforce by applying analytics to various artifacts associated with an employee including a free form text description of their skills. The '765 application describes an attempt to overcome some of the limitations of conventional human capital management systems by providing a more flexible way to recognize the unique skills of employees and to update categorization systems in newly developing skill areas.

The disclosed techniques have brought technical discipline and increased objectivity to human resources management processes. Viewed in aggregate, they dynamically update employee skill profiles and skill set definitions, make use of text mining to extract skill set metadata from documents, and attempt to match remedial resources with learning style. However, these techniques do not explicitly leverage text mining to identify concepts and their associated concepts. They do not include social networking data, including social networking tagging data, in their analytics. Furthermore, these techniques do not transparently leverage the activities associated with the data inputs used for skill assessment for the delivery of services focused on performance improvement.

Mentoring has proven to be an important ingredient in the growth of careers for individuals within a business or workforce enterprise. Mentoring within a workforce facilitates the transfer of skills to new employees as well as to current employees seeking to advance their careers. This benefits corporations by improving their ability to adapt to change. Tools to facilitate the initial matching of mentors and mentees, as well as to support the ongoing mentoring relationship have included sophisticated algorithms for matching profiles manually created by mentors and mentees. Known mentoring tools include the use of electronic collaborative environments including synchronous and asynchronous tools to enable one-to-one ("1:1") and one-to-many ("1:many") mentoring in cases where mentors and mentees are not co-located, or are always available at the same time.

That is, conventional "customized user experience" services and other tools for matching mentors and mentees require that an extensive profile be completed for each member that will be included as mentor or mentee rather than using existing information to facilitate the matching process. Once the match between mentor and mentee is established, known or commercially available tools support the ongoing delivery of the mentoring services. But conventional tools require manual repackaging or grouping of relevant content by the mentor before the same relevant content may be accessed by the mentee. The process of providing relevant content as part of ongoing mentoring services is for the mentor an extra task, which is not integrated into their day-to-day work.

For that matter, the field of social networking has shown explosive growth in the past few years. Social network analysis enables enterprises to identify members, e.g., employees, who are essential to internal communication processes, regardless of their position in the hierarchical organization chart. Social networking tools and application programs are known to identify employees not actively involved with communication processes, but possibly in need of mentoring to increase their skills so that they are more actively engaged by other employees. ("It's Who You Know", IBM Think Research, July 2005, Kate Ehrlich, Inga Carboni) http:// domino.research.ibm.com/comm/wwwr_thinkresearch.nsf/pages/20050706_think.shtml).

A variety of emerging web-based social networking services help people to find others of similar interests, and to share relevant content via new technologies such as blogs, wikis, and podcasts. For example, Really Simple Syndication™ (RSS) is a conventional tool or application program that enables individuals to keep up to date on content of interest without having to visit many different web sites. The content matching an individual's criteria is "pulled" to their RSS client via syndication services. RSS uses tagging, whereby individuals label content with meaningful terms and share the tags publicly, for improved information discovery. The tagging is useful where the content author or a subsequent viewer (if allowed) has tagged the content (of a file comprising an individual's data) with a label meaningful to the individual wishing to be informed of the content. RSS feeds based on criteria including specific tags have enabled individuals to focus on content of specific interest to them, both externally on the Internet and internally, via Intranets.

One example of the use of intranet based tagging to facilitate customized RSS feeds is the use of IBM's Dogear™ application. Dogear enables focusing on specific tagging by IBM subject matter experts. The tag feeds, with their associated URLs, are syndicated from Dogear to any RSS aggregator available to an IBM employee. As an example, an IBM employee "A" may focus on an IBM employee "B" social network analysis ("sna") tags by creating a Dogear RSS feed. Employee A may thereafter view the feed of employee B's sna tags in employee A's RSS aggregator.

Focused RSS feeds of tags could be used for skill remediation via "1:1" or "1:many" mentoring or e-learning. The application is limited, however, due to the complexity in identifying where different tags have the same semantics, or where the same tag can have different semantics depending on the context. Recent research, Zhang, et al., Exploring Social Annotations for the Semantic Web", Proc. of the 15th Intl. World Wide Web Conf., pp 417-426, ACM Press, 2006, suggests a "bottoms up" method to identify the concepts behind existing tags. The concepts are labeled with related tags that are applied to improve information discovery and search via filtering and ranking. This innovative "bottoms up" research does not rely on text analytics, and has not been applied to the task of facilitating matches between mentors who have mastered certain identified concepts and mentees who are lacking certain identified concepts, as revealed by an analysis of their tagging.

In Degeratu, et al., An Automatic Method for Constructing Domain-Specific Ontology Resources, Proc. of the Language Resources and Evaluation Conference (LREC), Lisbon, Portugal, 2004, the authors rely on text analytics to perform advanced domain-independent semantic analysis of unannotated collections of documents (a corpus of business registration documents is used for empirical evaluation). Degeratu use machine learning and statistical techniques to discover terms, link equivalent terms into concepts, and learn relationships between concepts (general similarity relationships, and also "named" semantic relationships). The techniques disclosed therein may be used to analyze the lexical choices of different employees, provide information on the different senses of tags based on the context in which the tags are used, and make suggestions for related content (documents, ideas, people). Such techniques, however, have not been applied to the task of using tag analytics to identify concepts and contexts associated with individual employees, or members of an organization, for the purpose of facilitating matches between mentors and mentees.

The innovative research on tag analytics has not extended to dynamically facilitate matching mentors with mentees in need of learning concepts in the same context that the same concepts have been mastered by the mentors (i.e., available mentors). More generally, and beyond the challenge of matching mentors and mentees using tagging, conventional applications and tools must address the difficulties associated with relying solely on the use of text analytics for determining correct labels for clusters. The known methods appear to lack robustness because they appear to have difficulty disambiguating between two senses of a tag. What would be welcomed to the skilled artisan is a service oriented architecture arranged to provide services to support organizations in the initial matching of mentors and mentees, and to support ongoing delivery of mentoring services based on tag analytics, and a method for providing such services and implementation.

SUMMARY OF THE INVENTION

To that end, the present invention is directed to the use of the tag analytics to identify concepts and their associated contexts in a variety of dimensions, each dimension potentially including two or more categories, for the purpose of matching people for various purposes in an enterprise such as a corporation. For example, in one embodiment tag analytics are used to identify concepts familiar to or unfamiliar to mentors and mentees, and their associated contexts, within an organization, for the purpose of assigning mentors to mentees. With more particularity, in this embodiment, an inventive mentoring-related service method and system is disclosed for use in enterprise wide domains, such as local or wide area networks that are maintained and operated by large organizations such as businesses and corporations in order to match or identify members, e.g., employees, by any number of context and concept label descriptors. The reader and skilled artisan should note, however, that the method and system of the invention could be implemented on a stand alone processor with access to memorialized records that can be assigned concept and context labels, and may be used to implement the matching on any member file related to an organization, not merely workforce employees of a workforce organization, but by the member's electronic file record or representation in practically any conceivable organizational scheme.

In essence, an employee profile is a collection of labels which constitute some basic metadata about an employee, including but not limited to name, gender, home address, job responsibilities, skills, etc. The context and concept labels identified by the inventive system define various aspects of a member's file in a memorialized and accessible data form, e.g., an employee profile, which represents the employee/member as a member of the organization. The labels become associated with, or incorporated into the member's (or employee's) recorded profile within the domain. The concept and context labels may derive directly from information contained in an existing file, or may be uniquely generated descriptors.

The labels may comprise descriptions to identify and describe the member's (or employee's) special skills, special experience, papers published, research focus, patents awarded, etc., and any other descriptor that somehow characterizes the employee or his/her efforts. For example, the descriptor labels may identify an employee's availability enterprise wide to act as a mentor, an employee's need for a mentor (as mentee), his/her present and past learning experiences, future skill-gap and learning needs, etc. For that matter, an employee's context and concept labels may include links to various objects associated with the employee, such as text files, image files, etc.

By providing the concept and context label information about members, e.g., employees within an enterprise wide domain, the invention supports the exchange of organizational, e.g., corporate knowledge, in the enterprise wide domain. With respect to workforce management in the context of a workforce organization, the invention may be implemented to represent and categorize employee skills and skill affinities for various purposes. Such purposes are almost unlimited, including but not in any way limited to forecasting workforce member skill demand, optimizing human resource capacity planning, and matching skilled worker resources to demand for same skilled resources. Moreover, both mentoring and e-learning may be implemented through the use and support by the invention to remediate the skill gaps identified with an organizational member, i.e., identified in the member's organizational profile.

For another end, the invention facilitates learning in an organizational environment, e.g., a corporate environment, for identifying concept skill gaps for remediation via learning management systems, and customized role enabled intranet portals that may be further personalized using the invention based on an analysis of the employee's tagging behavior. Personalization might include learning styles (http://en.wikipedia.org/wiki/Learning_styles or/and http://www.chaminade.org/inspire/learnst1.htm)

The novel employee tagging behavior analysis provides an end-user with an indication of which concepts related to the domain of the role enabled portal (example, market intelligence) are not well understood by the employee. By understanding such learning needs, remedial action may then be taken to provide the employee with the learning he/she requires to improve their skill set.

For another end, the enterprise can be a virtual enterprise over the Internet, which relies on adhoc/on-demand/dynamically generated team—e.g. programmers or marketing specialists.

The method of the invention may include generating text from audio files, video files and pictures using known speech to text conversion technologies. When the inventive method uses probabilistic clustering, the probabilistic clustering improves the matching by identifying learning readiness contexts associated with mentee concepts. For that matter, the inventive operation of the text analytics normalizes the tagging data, which may be attached by individual via a system user's interface or automatically by implementation of the text analytics. The matching of mentors and mentees by the novel method may be implemented by combining the concept and context-based operations with social networking analysis techniques.

Mentoring services provided by using the novel method and/or system of the invention may be delivered using syndication of tagged content. More, any part of the novel method that includes attaching concept and context labels may further include automatically generating labels by analyzing resource data and social networking tagging data. Members may be matched by complementary skill labels, and may have both mentor and mentee labels associated with his/her profile. Members may be qualified as a mentor or mentee for a particular concept or context, and the matching may be used to assemble a virtual team. The invention may be implemented as an enterprise-wide domain that is a proprietary computer based network, or the Internet. Of course the inventive operation includes modifying automatically a members associated concepts and contexts where it is determined that the members skills have changed.

DETAILED DESCRIPTION OF THE INVENTION

The inventive system and method is directed to the use of the tag analytics to identify concepts and their associated contexts in a variety of dimensions, each dimension potentially including two or more categories, with the objective of matching people for various purposes in an enterprise such as a corporation. For example, in one embodiment tag analytics are directed to identifying concepts familiar to or unfamiliar to mentors and mentees, and their associated contexts, for the purpose of assigning mentors to mentees.

With more particularity, the inventive system and method provides for matching mentors and mentees based on an analysis of their tagging behavior in order to facilitate the identification of potential mentees that need to master identified concepts in the same context as that of the identified potential mentors who are known to have already mastered said identified concepts in this context.

Figure 1:
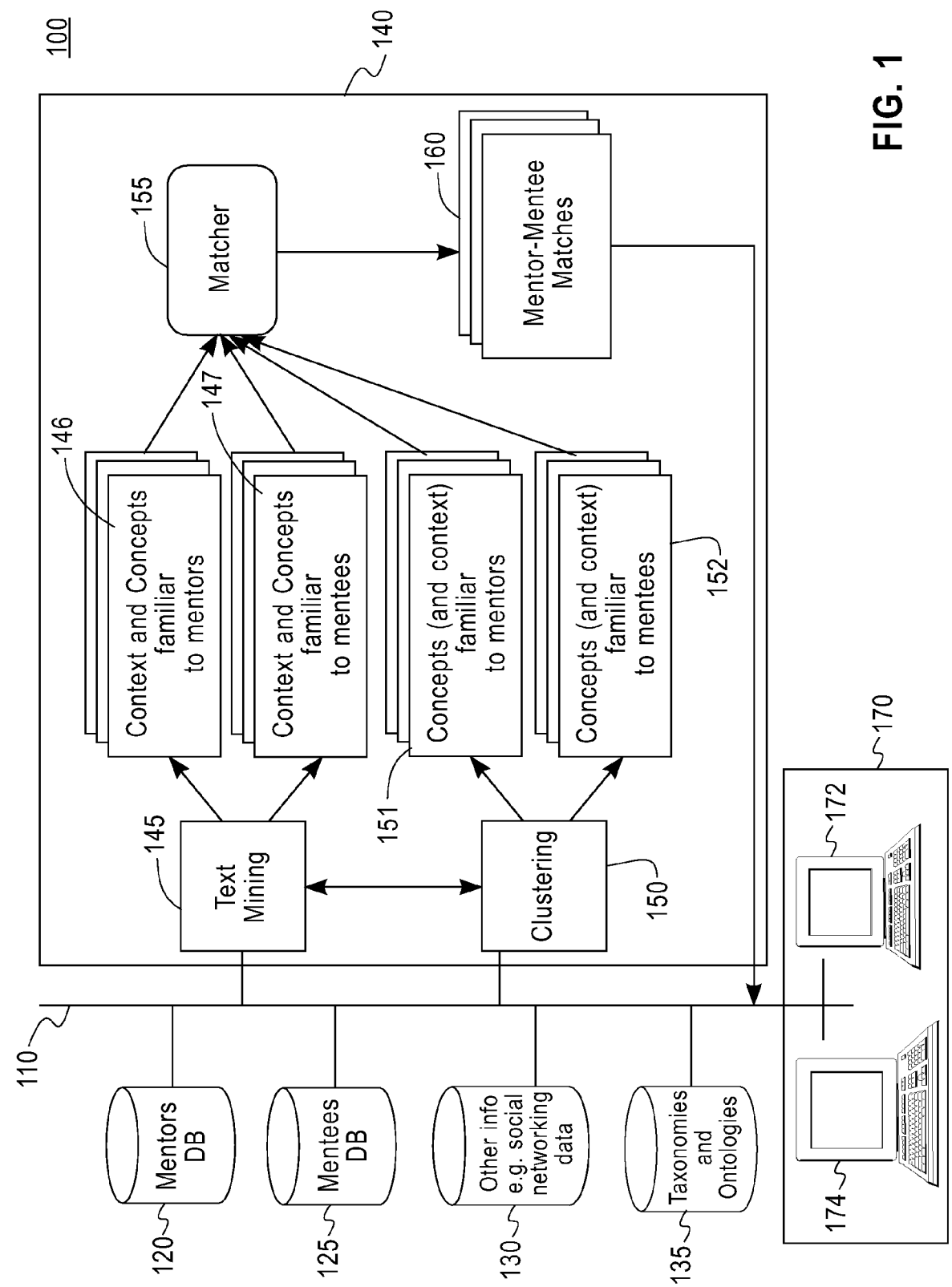
FIG. 1 is a system level diagram highlighting conceptual flow within an exemplary system in which the invention is implemented.

FIG. 1 herein is a schematic block diagram depicting one embodiment of matching system 100 of the invention. While the FIG. 1 mapping system and its explanation herein are directed to workforce management, where the electronic files operated upon are employee mentor and/or mentee employee profiles, the description is meant only for exemplary purposes. That is, the invention is directed to use by an organization and its members, which are not limited to workforce management, but to any organization and its related members, and the member profiles, for managing a set of member files by matching, comparing, and qualifying the matches based on the concept and context labels and the tag analytics described in detail herein.

The following terms are used herein to describe the broad inventive principles and specific embodiments of the invention.

Object—The term "object" is used herein to describe an artifact such as a web page, member patent, paper, video, related people, an idea, etc., which are not limited to a digital encoding and representation in a file.

Social Networking data—the term "social networking data" as used herein describes data relating to a social network comprising an enterprise, organization or institution, and may include any data derived either automatically or by user input from a social network analysis.

Social Networking tagging data as used herein is understood to describe any of a set of all tags for association with a member of a social network. The tags or tagging data may comprise social networking data, or may relate to the social networking data, or may derive from any other data associated with an organization's member or members, regardless of how the tag is assigned.

Tag—The term "tag" is used herein to describe metadata consisting of one or more tokens assigned to an object by a member of an enterprise or assigned to an object by computer mediated text analytics. When tags are derived from the social networking data. Typically the sources of tags are "taggers." Taggers are people who tag "objects". Computer programs can also create metadata, i.e. tags. The present invention includes and uses both tags created by people and tags created by computer programs, i.e., programmatic taggers. For example, "Java" and "Java 5" might be tags applied to a posted CV. "Tagging" may be carried out using a private enterprise intranetwork, as well as over the public Internet.

Concept Label—The term "concept label" is used herein to describe metadata describing a core attribute of a member's skill set. The concept label may comprise only a single "piece" of metadata, or one or more attributes derived from a tag and its context to represent the semantic information behind the tag, e.g. "Java 'In' Programming Languages", where "In" is a class membership operator. Concept might be an abstract representation, e.g., probability distribution over tags.

Context Label—The term "context label" is used herein to describe additional metadata, the additional metadata for describing various dimensions of a concept label. For example, Java, building financial models, stock trading, etc., might provide context for Java. Context Label information can be given as a collection of tags (syntactically) as a collection of semantic entities based on a taxonomy/ontology or more abstractly as a probability distribution over tags or concepts.

Profile File—The profile file as used herein refers to a collection of labels which constitute some basic metadata about a member, including but not limited to name, gender, home address, job responsibilities, and skill concepts and associated contexts.

Comparison—the term comparison as used herein should be understood to represent a functional operation performed on two inputs to generate a single output.

Connect—the terms connect, connecting, communicating and communication as used herein should be interpreted as meaning any means or technique known to the skilled artisan for allowing an exchange of signals in any form e.g., to a linking between two elements in order for the two elements to communicate. As such, for example, a processor may be said to be connected to a remote database by some means to facilitate the exchange of signals comprising command data in order to communicate to the database to respond by sending data contained in the database in a form of a signal representative of the data.

Matching system 100 includes an enterprise service bus 110 that connects a mentor database 120, a mentee database 125, a social networking database 130 and a "taxonomies and ontologies" database 135. A bus 110 connects the databases to a matching function (module) 140, including various available compute modules. That is, matching function 140 includes a text-mining module 145 and a clustering module 150. The mentor and mentee databases include information or files of the organizational members, which files or profiles may represent possible or active mentors and mentees. Information contained in the member files, including identified concepts and associated contexts, may be overlapping.

Text mining module 145 mines contextual information from the databases to identify concepts and their associated contexts familiar to mentors (146), and concepts and their associated contexts familiar to mentees (147). Clustering module 150 uses clustering algorithms to generate concepts and their associated contexts familiar to mentors (151), and concepts and their associated contexts familiar to mentees (152). The various identified concepts and associated contexts as stored in the employee profile files and are operated upon by a matcher function 155, which operation generates mentor-mentee match files 160. The mentor-mentee match files 160 may be communicated to an interfacing function 170, which includes workstations 172, 174.

System 100 relies on two parallel functions, each of which can optionally be used to supplement the other for improving the overall effectiveness of the matching process of the invention. In the enterprise environment of system 100, the mentor (120) and mentee (125) databases may comprise an enterprise directory that includes additional fields associated with an employee to indicate his/her interest in providing or receiving mentoring services or attributes. Different or new fields or values are determined by the inventive system's parallel abilities for use in the matcher module.

Social networking data, such as in a form of employee-assigned tags, can be stored in an intranet-based tagging repository (not shown in FIG. 1) after an employee creates the tags. The tags are created in the FIG. 1 embodiment by a user through a user interface available at workstations 172, 174, using interface function 170. Examples of available user interfaces for tagging, or application programs for tagging include Dogear™. Alternatively, tags may be entered by employees in an external service such as (http://del.icio.us/tag/). The reader and the skilled artisan alike should understand that this would preclude employee (i.e., member) tagging intranet-based objects. However, in addition to tags assigned by employees, tags could be assigned by text analytics of the inventive system, or by others text analytics.

Optionally, enterprise taxonomies and ontologies could be employed by the inventive system, as represented by taxonomies and ontologies database 135. Enterprise taxonomies and ontologies may be used to assist in the extraction of semantic relationship patterns by the inventive text analytics function. Both the text mining (module 145) and probabilistic clustering module 150 may separately be used to analyze employee-tagging behavior. For example, text mining and probabilistic clustering may be implemented by the respective modules to identify and match mentors and mentees based on a combination of identified concepts. Text analytics implemented by module 145 may additionally identify mentor and mentee context, either when used separately, or when used as an optional add-on to the probabilistic clustering function. The identified concepts and contexts for potential mentors and mentees are input to the matcher module 155.

The matcher module compares the concepts and contexts to identify new mentoring relationships or to update existing ones, as represented by mentor-mentee matching files 160. The present invention allows an arbitrary operation of the matcher 155; while in one embodiment matcher matches mentees unfamiliar with some concepts with the mentors who are familiar with the concepts, in another embodiment the match may be based on the learning styles of the mentor and the mentee, on their countries of origin or on any other arbitrary criteria that can operate on sets of concepts and contexts.

Figure 2:
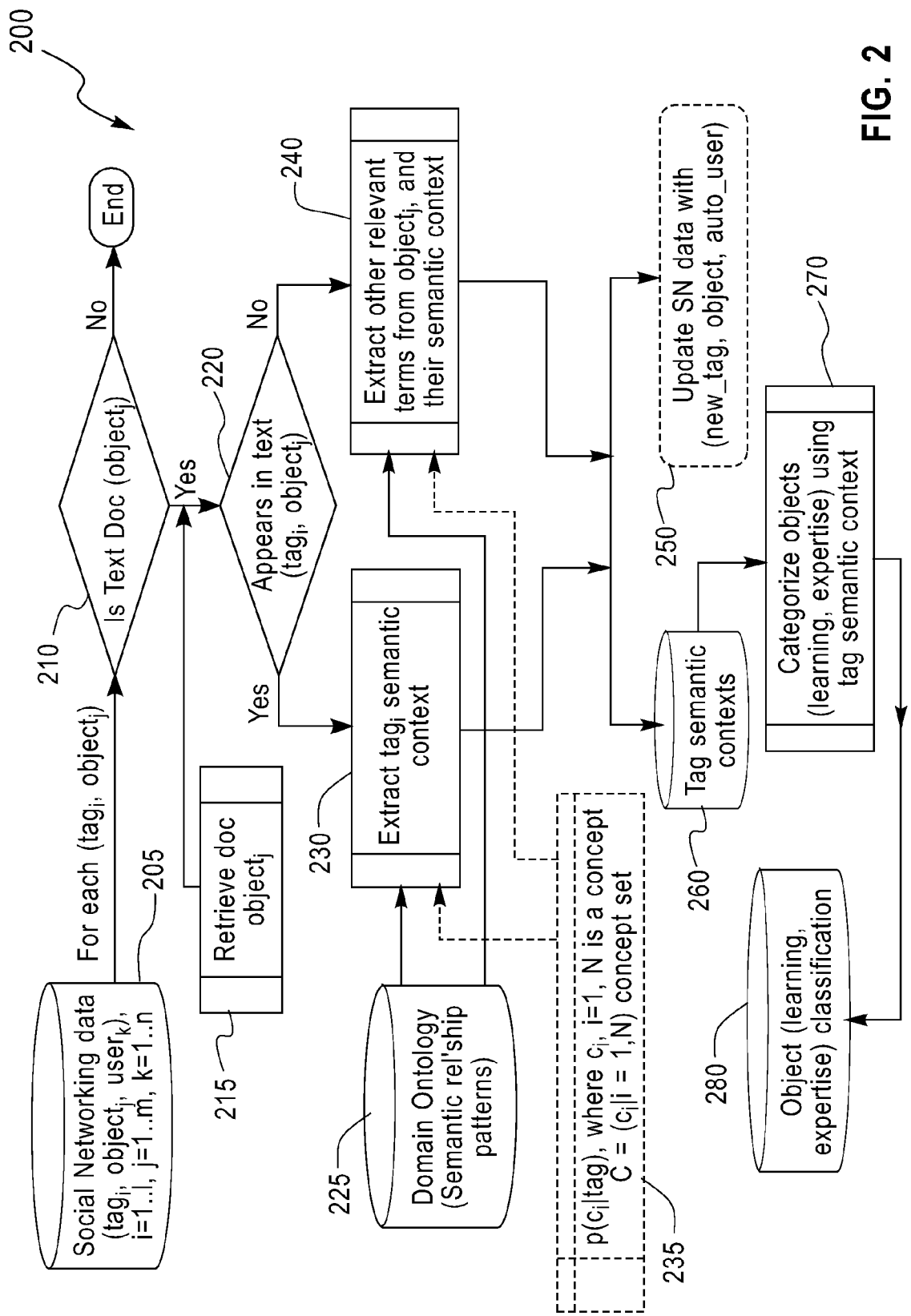
FIG. 2 is a flow chart highlighting the inventive process using the text mining tag analytics of the inventive system.

FIG. 2 is a flow chart depicting general steps required for using or implementing one embodiment of a text miring tag analytics method 200 of the invention. Novel method 200 must access or extract social networking data, for example, from a social networking database 205 (shown for simplicity) for each object (of "j" objects) maintained therein. At decision block 210, assesses each object, wherein if an object "j"

is present, a functional block 215 retrieves the object. That is, if a given tag appears in the text of the tagged object, text-mining analytics extract semantic content, which extracted data are useful in determining context. For example, if a mentee using the tag "Java" is trying to learn Java, trying to master it, or trying to write documentation about Java, the tagged document can serve as reference material.

Decision block 220 decides if the object identified in block 210 includes one of "i" tags. If it does, the method implements a step represented by block 230, wherein the tag and/or semantic context is extracted from the object. The extraction step 230 is supported by domain ontological data, such as that derived from a domain ontology database 225 (shown for simplicity), and probability functional set 235.

If the object identified in block 210 does not have a tag, functional flow moves to a step represented by a block 240, wherein other relevant information associated with the object is extracted. Blocks 225 and 230 support the function of extracting block 240. That is, if a given tag does not appear in the tagged object, the text mining analytics extract other relevant terms from the object and semantic context with the objective of validating and updating domain ontologies (semantic relationship patterns), which are shown as optionally provided by the enterprise employing said mentors and mentees.

The output of functional blocks 230 and 240 are provided to an update function represented as block 250, and to a tags semantic context database 260, or other accessible storage for storing the tag semantic contexts. Update function 250 provides a data structure for updating the social networking database 205 with new tag information about the object. Tags semantic context database 260 provides context information to a context categorization function 270, which categorizes the object in accordance with semantic context derived from the context information. The output of functional block 270 is provided to object database 280.

Text mining tag analytics include previously disclosed normalization analytics. Text mining tag analytics are used where the tagged objects are audio or video files, wherein included audio may be converted to text via previously disclosed speech recognition technologies. The text mining tag analytics may be used where access to the text contained in the tagged documents is restricted, possibly because the text is confidential. Described below are two variants of the inventive system as applied to matching mentors and mentees based on interest in the same project or competitor.

Example 1

Initial assumptions are made. It must be assumed that there is a list of facts/relations (types) that are confidential, e.g., x works on project y, where y is of type Y. For example, type Y could be all intelligence related project, or reverse engineering, etc. Alternatively, x is interested in y where Y is a type (e.g., "competitor=Accenture"). There is a sublist L of types Y that can be basis for similarity matching; and L can be taxonomy or ontology (optionally). Matching is carried out as follows. If x1 and x2 share relation and type (i.e., x1 rel1 y1, and x2 rel1 y1), then the system may posit that there are two similar jobs/interests, and x1 and x2 should "talk" (assuming other reasons for matching hold).

Example 2

The matching is implemented based on a confidential text (e.g. by computing the similarity between vectors representing respective interest). The message may be the same as in Example 1. In both examples 1 and 2, an index is created. The reader and skilled artisan alike should take note that the first index requires semantic preprocessing (text analytics) and the second one doesn't. Optionally, the text mining analytics embodiment depicted in FIG. 2 may be supplemented using probabilistic clustering. For that matter, the probabilistic clustering function 235 may be applied to disambiguating different senses of tags when assigning labels.

Figure 3:
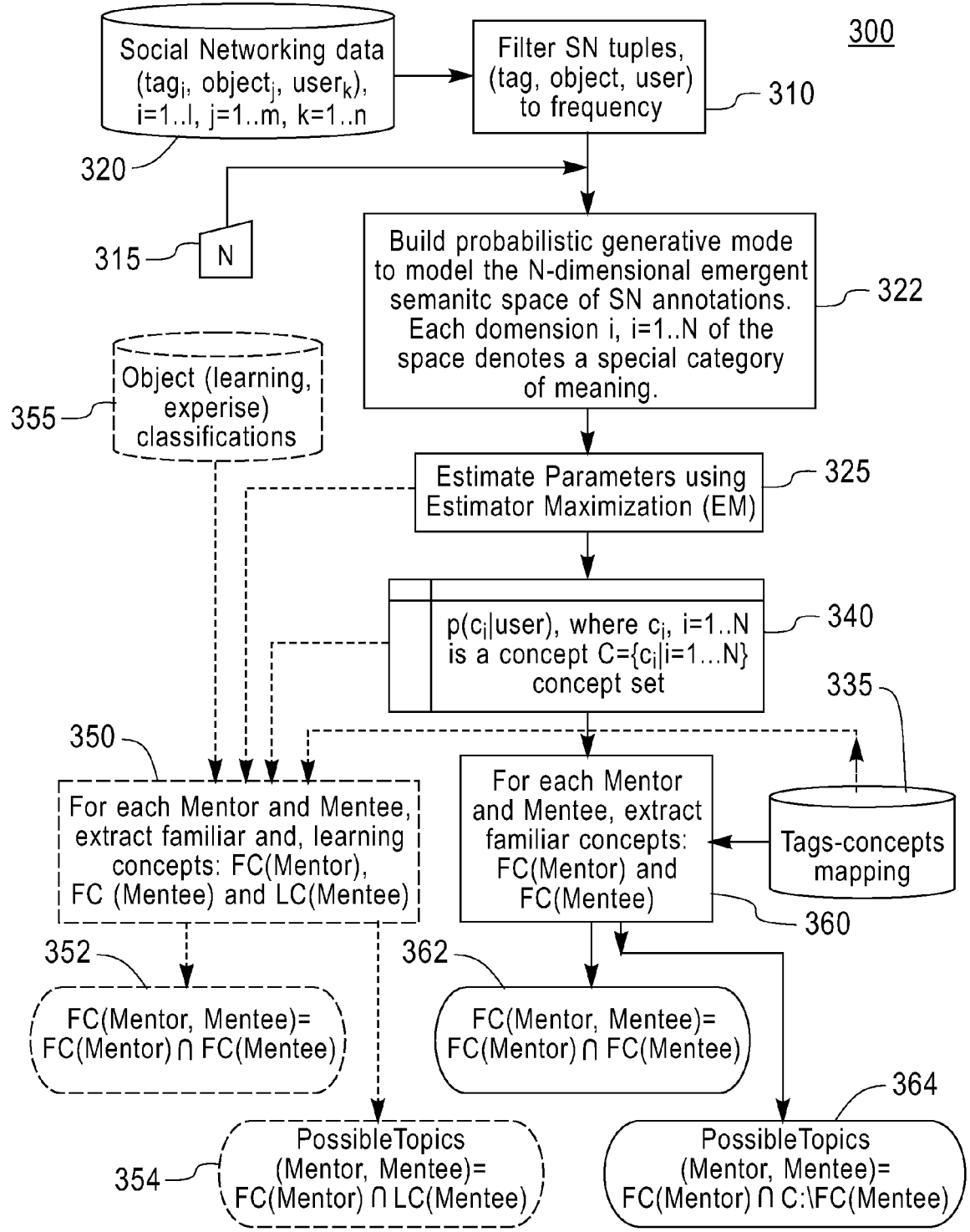
FIG. 3 is a flow chart highlighting the inventive probabilistic clustering technique tag analytics.

FIG. 3 is a flow chart depicting general steps required for using or implementing the novel matching using probabilistic clustering tag analytics. The FIG. 3 method 300 begins at block 310, which is a filter function. The filter function operates upon social networking information, which may be contained in a social networking database 320 that is accessible to the block 310 filtering function. The filter function will exclude tag-object co-occurrences that have too few frequencies. These very low-frequency co-occurrences merely increase the computation burden but have minimal impact to the final result of the probabilistic clustering. The networking information includes any number of "j" objects, including any number of "i" tags, for any number of "k" users. The probabilistic clustering tag analytics implemented by the novel method are not dependent upon text analytics, but define concepts as distributions of tags, which distributions of tags are unlabelled from the perspective of human consumption. Concepts familiar to both potential mentors and potential mentees can be identified by the probabilistic generative model or method as shown.

To that end, block 322 represents a functional step of building a probabilistic generative model of an N-dimensional emergent semantic space of social network annotations, and block 325 represents a step of estimating parameters using an estimation maximization (EM) function.

Each dimension, "i," where I=1 to N of the space denotes a concept. This is a frequently used method for representing concepts and can be traced back to as early as the Latent Semantic Analysis method. An example of a latent semantic analysis may be found in a paper by Scott Deerwester et al, Indexing by Latent Semantic Analysis, Journal of the American Society for Information Science, 41(6), 1990. Such probabilistic clustering-based tag analytics may also identify concepts familiar to mentors but unfamiliar to mentees. The output of block 322 is provided as input to a functional block 325, within which particular parameters are estimated using an estimation maximization algorithm. An example of such an algorithm is described in a paper by: Arthur Dempster, Nan Laird, and Donald Rubin entitled: "Maximum likelihood from incomplete data via the EM algorithm," *Journal of the Royal Statistical Society*, Series B, 39(1):1-38, 1977.

A probability clustering function is represented by block 340, operating on data output from function 325. Probability clustering function 340 calculates the probability distribution of a tag based on concepts, and the probability distribution of a tagger, based on the concepts. The probabilistic clustering tag analytics calculates $p(c|u)$, where u is a tagger (typically a user) and c is a concept. The concepts familiar to a tagger u can be defined as the top 10% of, for example, the concepts that have the largest $p(c|u)$ values. The output of probability clustering function 340 is provided, along with an associated object classification, e.g., from an object database 355 (shown for simplicity), and an output from functional block 325 to an extractor function represented by block 350. The probabilistic method does depend on identifiable taggers to calculate $p(c|u)$—the distribution of concepts to taggers. For automatically generated tags, e.g. using text analytics as taggers, they can be treated as tagged by the same user in the co-occurrence of (tag, user, text object).

In block 350, FC (mentor), FC (mentee) and LC (mentee) denote, respectively, the set of concepts familiar to mentor and mentee, and the set of learning concepts. Learning concepts comprise those concepts calculated by said probabilistic clustering tag analytics. The concepts and learning concepts familiar to both mentor and mentee are found at the intersection of FC (mentor), FC (mentee), as represented by block 352. The possible topics are found at the intersection of FC (mentor), LC (mentee), as represented by block 354. In block 360, they are extracted from data provided by probability clustering function 340. The terms FC (mentor) and FC (mentee) denote the sets of extracted concepts familiar to mentor and mentee, respectively. The concepts that are familiar to both a specific mentor and a specific mentee are the intersection of FC (mentor) and FC (mentee), as represented by functional block 362. The concepts familiar to an individual mentor but unfamiliar to an individual mentee are the intersection of FC (mentor) and C\FC (mentee), as represented by functional block 364. This suggests possible topics for the mentoring relationship.

Optionally, if the concepts are semantic entities derived from tags the parameters estimation function 325 additionally uses the Tags-Concepts mapping function 335 to compute p(c|u). The content of 335 can be derived as an optional output since text analytics may provide the basis for producing associations between tags and concepts. For the purpose of this invention, database 335 may be used to map tags into concepts. The information contained in database 335 may be used as additional input for computing p(c|u) by function 340, as well as additional input for computing FC (Mentor), FC (Mentee) and LC (Mentee) by function 350. Such additional information might be used for example to relate two concepts through a taxonomy or any other hierarchy.

Hence, the invention provides for the optional use of the text analytics to supplement said probabilistic clustering technique tag analytics. The optional text analytics identifies learning readiness on the part of a mentee. For example, the tags assigned by a mentee could indicate that they are familiar with a concept by a text analysis of said tags, in conjunction with the text of the tagged documents, could reveal the context of the tags assigned by the mentee. So the mentee's tags may indicate a readiness to learn the concept in question rather than indicating that they have mastered the concept. The optional text analytics additions to the probabilistic clustering technique tag analytics provide a fine-tuning of the mentor-mentee matches based solely on the inventive system's probabilistic clustering technique tag analytics.

Figure 4:
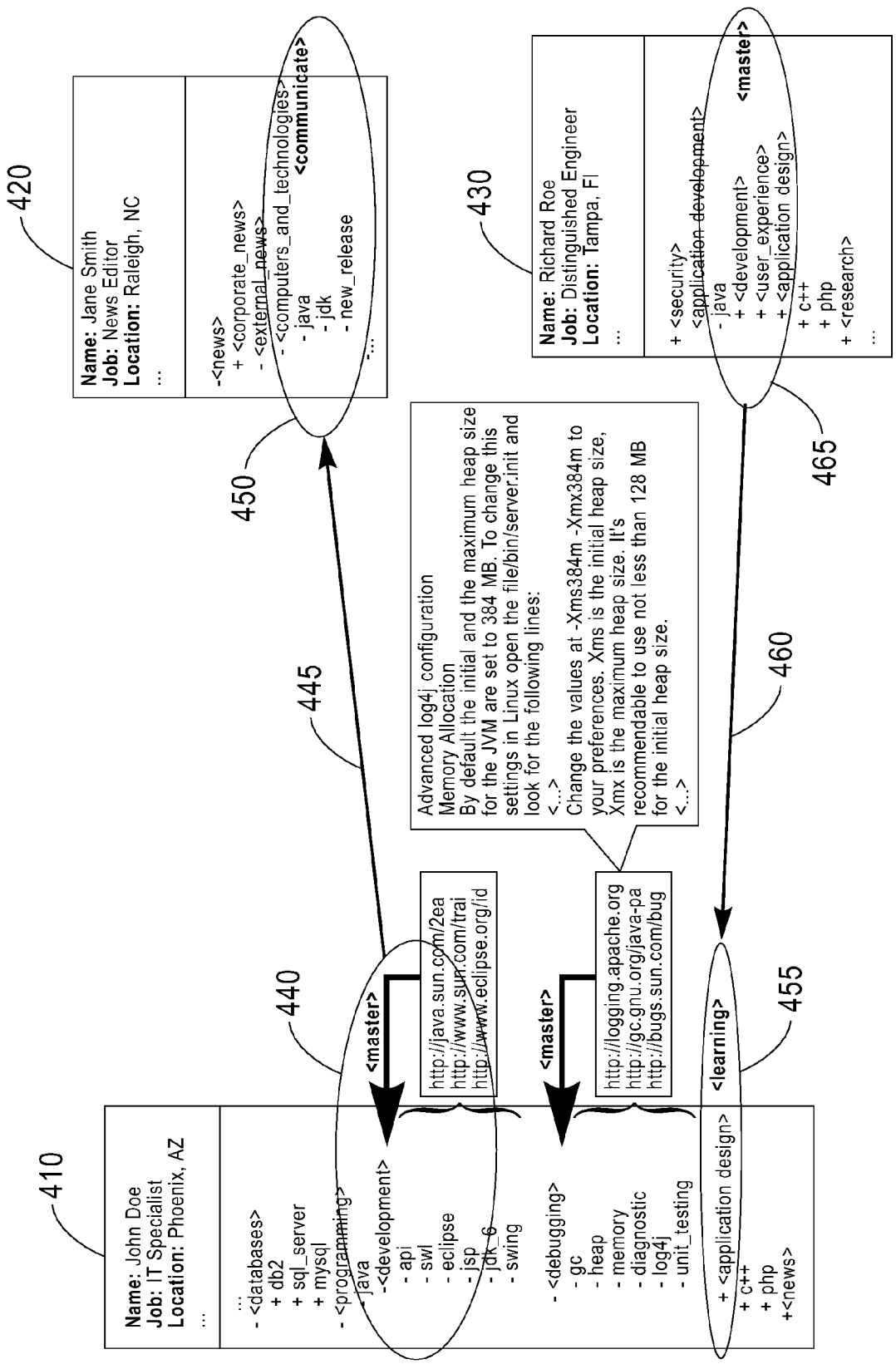
FIG. 4 is an example of parts of three employee profiles depicting related concepts and associated contexts used by the inventive system to match mentors and mentees.

With more particularity, FIG. 4 is an example of parts of three employee profiles depicting related concepts and associated contexts used by the inventive system to match mentors and mentees. That is, FIG. 4 depicts a profile (410) and identified contexts for John Doe, an IT Specialist with extensive knowledge on all aspects of Java and Java programming. The inventive system and method analyze tagging data pertaining to John Doe together with text documents attached to this user. This tagging data may comprise social networking tags assigned manually by John Doe, as well as tags assigned by the applied text analytics of the invention to documents attached to this user. These might include papers and patents John Doe has authored.

The inventive operation extracts sets of hierarchical linked concepts and associated tags that form the user's profile, as shown. The text analysis function implemented estimates the user's knowledge level and needs on an enterprise wide global scale. The text analysis function then derives personalized context labels for important concepts in the user's profile. These concepts and user's respective contexts are used to match users with complimentary knowledge requirements. Ovals 440, 450, 455 and 465 as shown in the figure indicate an association calculated or conducted by the text analytics function between important concepts in the user's profile and their personalized context labels. For example, Jane Smith (by profile 420) is a communication specialist who needs to write an article about the impact of a future Java JDK release would be matched with John Doe, who has extensive expertise on Java development (see John Doe's profile 410). The matching enables that John Doe can provide Jane Smith with information about additional features and major changes in the new release. This operation is indicated by arrow 445 as seen in FIG. 4 extending from oval 440 to oval 450.

On the other hand, where John Doe wants to advance his career and is looking to learn more about application architecture, the novel method will match him to the hypothetical Richard Roe, by his Richard Roe profile 430. Richard Roe, who is an expert in application design can offer that expertise. Arrow 460 indicates the direction that the application design data provided by Richard Roe to John Doe, between oval 465 and oval 455 as shown. As noted previously, the inventive system and method is directed to the use of tag analytics to identify concepts and their associated contexts in a variety of dimensions, each dimension potentially including two or more categories, for the purpose of matching people for various purposes in an enterprise such as a corporation.

In another embodiment, the inventive system is directed to the matching of individuals to serve on a patent team in an enterprise. Experience has shown that the most valuable patents often result by having a team comprised of individuals with various combinations of technical and domain expertise, in order to identify other fields to which an invention can be directed.

In the vocabulary of this inventive system embodiment, when building a patent team, employees with expert knowledge in certain concepts (technical skills) need to be combined with employees with experience with these concepts in different contexts (domains). Ideally, one or more individuals with a basic familiarity with a broad range of concepts, perhaps in only one or two contexts (for example, a professional educator having a basic familiarity with a number of concepts in the education context), needs to be matched with one or more individuals with a deep technical expertise in one or more of these concepts, hopefully across multiple domains (for example, an expert in service oriented architectures who has worked on engagements in a variety of industries).

The inventive system will, for each concept (example SOA), identify contexts along two dimensions—expertise (learning readiness, some knowledge, expert) and domain (education, real estate, travel, finance industries). The inventive system therefore mines patents and papers authored by the individual employees themselves as well as objects authored by others, which the employees being considered for the patent team have tagged. Each employee's profile file in an enterprise directory would be updated to include identified concepts as well as their contexts along the two dimensions noted—expertise and domain.

Users of the inventive system would select the concepts and contexts required for the team as well as the maximum number of employees to be included. In one embodiment of the inventive system, the individual employees providing the optimal team from those in the enterprise directory would be identified. If the user then changes certain input parameters, such as by adding domains (an additional industry—manufacturing) or concepts (virtual worlds) or changing the minimum and maximum number of requested individuals, the inventive system modifies the list of recommended employees for the team.

In addition to being used for matching employee mentors and mentees, or for matching along other dimensions besides familiarity/unfamiliarity based on identified concepts and their associated contexts, the novel system may optionally provide for ongoing delivery of services based on the matching. For example, in the case of mentoring services, delivery would be via feeds of tag clusters associated with concepts familiar to a mentor and unfamiliar to the mentee, but for which the mentee has expressed a learning readiness. The bundles of mentor tags can be delivered to mentees via previously disclosed syndication services, such as RSS™. The invention thus enables mentors to provide relevant conceptual content to one or more mentees as a byproduct of the mentors' normal tagging processes. This consequently enables mentors to provide more effective mentoring services to more mentees by spending their time on personal contact with the mentees rather than on constructing document sets of conceptual content needed by the mentees lacking familiarity with said concepts in specific contexts.

The inventive system may be embodied in a single monolithic application such as depicted in FIG. 1, or as part of a service oriented architecture, whereby the modules communicate through an SOA service bus.

Figure 5:
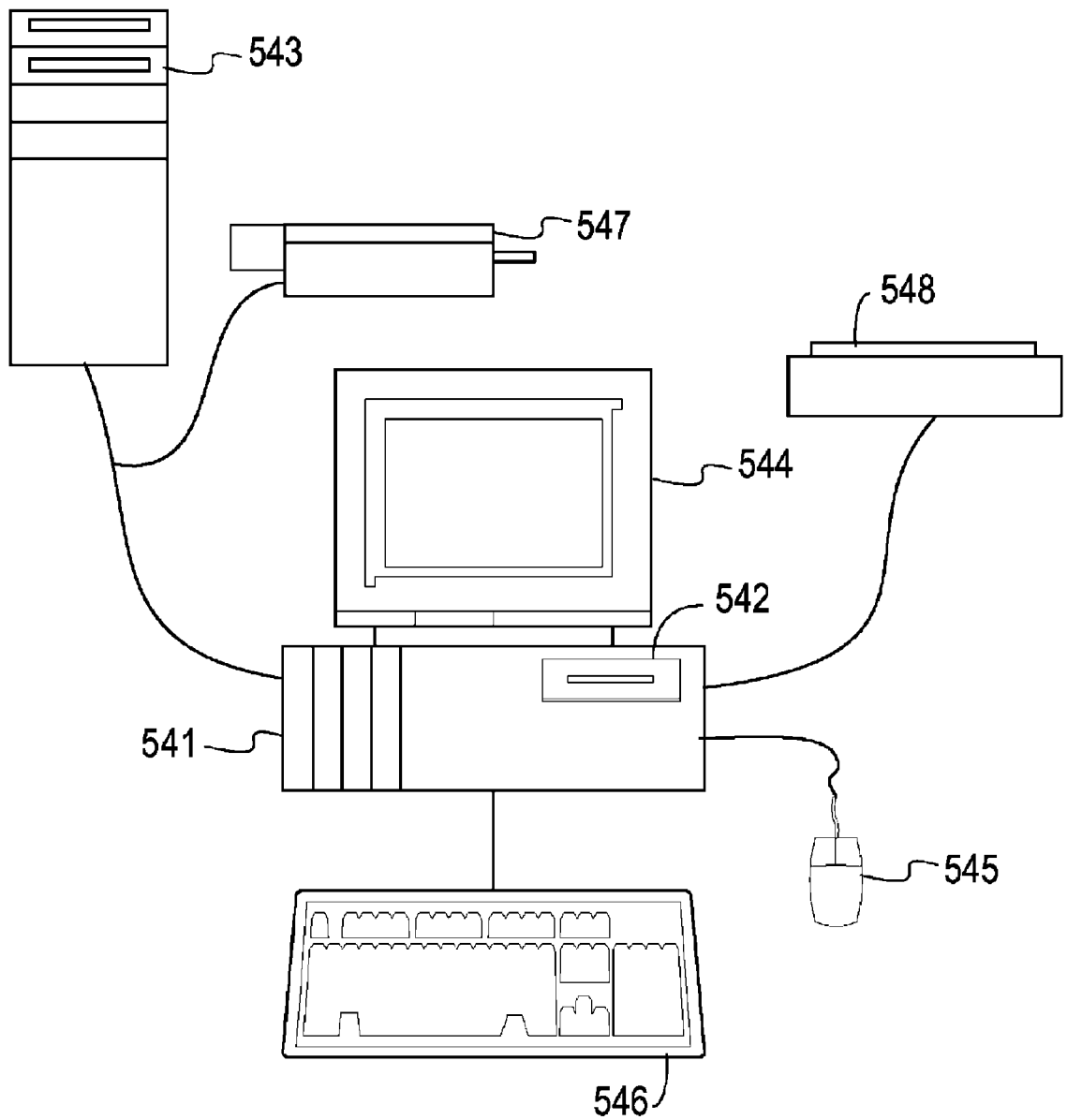
FIG. 5 is one example of a computer-based system 500 by which the method of the present invention may be carried out.

The various method embodiments of the invention will be generally implemented by a computer executing a sequence of program instructions for carrying out the steps of the methods, assuming all required data for processing is accessible to the computer, which sequence of program instructions may be embodied in a computer program product comprising media storing the program instructions. A computer-based system 500 is depicted in FIG. 5 herein by which the method of the present invention may be carried out. Computer system 500 includes a processing unit 541, which houses a processor, memory and other systems components that implement a general purpose processing system or computer that may execute a computer program product comprising media, for example a compact storage medium such as a compact disc, which may be read by processing unit 541 through disc drive 542, or any means known to the skilled artisan for providing the computer program product to the general purpose processing system for execution thereby.

The program product may also be stored on hard disk drives within processing unit 541 or may be located on a remote system 542 such as a server 543, coupled to processing unit 541, via a network interface, such as an Ethernet interface. Monitor 544, mouse 545 and keyboard 546 are coupled to processing unit 541, to provide user interaction. Scanner 547 and printer 548 are provided for document input and output. Printer 548 is shown coupled to processing unit 541 via a network connection, but may be coupled directly to the processing unit. Scanner 547 is shown coupled to processing unit 41 directly, but it should be understood that peripherals may be network coupled or direct coupled without affecting the ability of workstation computer 540 to perform the method of the invention.

As will be readily apparent to those skilled in the art, the present invention can be realized in hardware, software, or a combination of hardware and software. Any kind of computer/server system(s)- or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Although a few examples of the present invention have been shown and described, it would be appreciated by those skilled in the art that changes may be made in these embodiments without departing from the principles and spirit of the invention, the scope of which is defined in the claims and their equivalents.

What is claimed is:

1. A computer-based method for operating upon a store of social networking data representative of members of an organization in order to provide mentoring services within the organization, the computer-based method comprising the steps of:
   identifying, by a computer, concepts within a mentor member's (mentor) social networking tagging data that are familiar to the mentor, with mentor concept labels;
   identifying, by the computer, concepts within a mentee member's (mentee) social networking tagging data that are familiar to mentee, with mentee concept labels;
   matching, by the computer, mentors to mentees based on a comparison of said respective mentor and mentee concept labels; and
   delivering, by the computer, mentoring services based on the matching,
   wherein the matching includes steps of:
      filtering, by the computer, the mentor's social networking tagging data and the mentee's social networking tagging data;
      building, by the computer, an N-dimensional semantic model of the mentor's and mentee's filtered social networking tagging data;
      calculating, by the computer, a probability distribution of the built N-dimensional semantic model based on the identified concepts within the mentor's and mentee's filtered social networking tagging data;
      performing a text mining method with the calculated probability distribution to distinguish concepts familiar to both the mentor and the mentee from concepts familiar to the mentor but unfamiliar to the mentee;
      extracting, by the computer, the concepts familiar to both the mentor and to the mentee based on the distinguishing; and
      obtaining, by the computer, the distinguished concepts familiar to the mentor but unfamiliar to the mentee.

2. The method as set forth in claim 1, wherein said concepts are identified within the social networking data based on tag analytics.

3. The method as set forth in claim 1, further comprising steps of:
   identifying, by the computer, contexts familiar to a mentor's social networking tagging data that are familiar to the mentor, with mentor context labels; and identifying, by the computer, contexts familiar to a mentee's social networking tagging data that are familiar to the mentee, with mentee context labels.

4. The method as set forth in claim 3, wherein said step of matching further includes matching mentors and mentees based on a comparison of said context labels.

5. The method as set forth in claim 2, wherein said tag analytics apply probabilistic clustering techniques.

6. The method as set forth in claim 2, wherein said tag analytics apply text mining techniques to extract semantic context from said social networking tagging data.

7. The method as set forth in claim 1, wherein said social networking tagging data include audio files, video files and pictures.

8. The method as set forth in claim 1, wherein said step of matching is implemented to match said mentors and mentees in such a way that labeling said concepts and contexts using a distance metric is not required.

9. A computer-based method for managing resource data within an enterprise wide domain that is representative of a plurality of members comprising the enterprise, comprising the steps of:
identifying, by a computer, concepts in the resource data that are associated with a member;
identifying, by a computer, contexts in the resource data that are associated with a member; and
matching, by a computer, members in accordance with the identified concepts and contexts using matching criteria,
wherein the matching includes steps of:
filtering, by the computer, the identified concepts and contexts;
building, by the computer, an N-dimensional semantic model of the filtered concepts and contexts;
calculating, by the computer, a probability distribution of the built N-dimensional semantic model;
performing a text mining method with the calculated probability distribution to distinguish concepts familiar to both members from concepts familiar to a member but unfamiliar to another member;
extracting, by the computer, the concepts familiar to the both members based on the distinguishing; and
obtaining, by the computer, the distinguished concepts familiar to a member but unfamiliar to another member.

10. The method as set forth in claim 9, wherein said concepts and their associated contexts pertain to a variety of dimensions, and wherein each dimension potentially includes two or more categories for the purpose of matching members for various purposes in an enterprise such as a corporation.

11. The method as set forth in claim 9 wherein said step of matching includes generating a virtual team of members based on said concepts and contexts.

12. The method as set forth in claim 9, wherein said contexts and concepts include mentor labels, and mentee labels, and wherein step of matching includes matching members identified as mentee with members identified as mentor.

13. The method as set forth in claim 12, wherein said mentor and mentee labels comprise informational list labels that identify a mentor's mentee, and a mentee's mentor, and wherein said steps of matching include adding additional concept and context labels to a member's existing labels to automatically modify the mentor/mentee's informational list labels.

14. The method as set forth in claim 9, wherein step of matching implements text analytics and text mining processes.

15. The method as set forth in claim 9, wherein a set of N concept tags and M context tags forms an (N+M)-dimensional semantic space.

16. A computer-implemented system for managing workforce, comprising:
at least one processing unit;
at least one hard disk drive coupled to the processing unit;
at least one database stored in the hard disk drive and run by the processing unit, that the database including workforce employee data, and social networking data associated with said employees;
a matching functional unit stored in the hard disk drive and run by the processing unit, the matching functional unit comprising:
a text mining function for mining contextual information from said at least one database to generate context labels for an employee,
a clustering function for generating concept labels for an employee based on said text mining,
and
a matching function that sorts and matches employees by said context and concept labels in accordance with a matching criteria,
wherein the matching functional unit performs steps of:
filtering, by the processing unit, the context and concept labels;
building, by the processing unit, an N-dimensional semantic model of the filtered concept and context labels;
calculating, by the processing unit, a probability distribution of the built N-dimensional semantic model;
performing the text mining function with the calculated probability distribution to distinguish concepts familiar to the employees from concepts familiar to an employee but unfamiliar to another employee;
extracting, by the processing unit, the concepts familiar to the employees based on the distinguishing; and
obtaining, by the processing unit, the distinguished concepts familiar to an employee but unfamiliar to another employee;
and
a user interface for providing user input to the support operation of the workforce management system.

17. The computer-implemented system as set forth in claim 16, wherein the employees belong to an organization under investigation to evaluate its human resource value in order to match the organization to a set of specific business requirements.

18. The computer-implemented system as set forth in claim 17, wherein the specific business requirements include qualifications for a corporate or asset purchase, and wherein said purchase is based on human resource characteristics.

19. The computer-implemented system as set forth in claim 16, wherein the clustering function implements probabilistic clustering techniques.

* * * * *